(12) United States Patent
Kondo

(10) Patent No.: US 8,982,435 B2
(45) Date of Patent: Mar. 17, 2015

(54) NON-TRANSITORY COMPUTER READABLE STORAGE MEDIUM STORED WITH PROGRAM FOR IMAGE FORMING SYSTEM, IMAGE FORMING APPARATUS, AND CONTROLLER

(71) Applicant: Konica Minolta, Inc., Chiyoda-ku (JP)

(72) Inventor: Katsuji Kondo, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/289,736

(22) Filed: May 29, 2014

(65) Prior Publication Data

US 2014/0355016 A1    Dec. 4, 2014

(30) Foreign Application Priority Data

May 31, 2013    (JP) .................................. 2013-116266

(51) Int. Cl.
*H04N 1/46*    (2006.01)
*G06K 15/02*    (2006.01)

(52) U.S. Cl.
CPC .................................. *G06K 15/1878* (2013.01)
USPC ............................ 358/504; 358/1.9; 358/518

(58) Field of Classification Search
None
See application file for complete search history.

(56) References Cited

U.S. PATENT DOCUMENTS

| 7,312,890 | B2 * | 12/2007 | Hatayama et al. | 358/1.2 |
|---|---|---|---|---|
| 7,319,545 | B2 * | 1/2008 | Linder et al. | 358/1.9 |
| 7,466,464 | B2 * | 12/2008 | Nakane et al. | 358/521 |
| 2001/0004284 | A1 | 6/2001 | Fukuda et al. | |
| 2008/0080027 | A1 * | 4/2008 | Mestha et al. | 358/504 |
| 2010/0165118 | A1 * | 7/2010 | Honeck et al. | 348/207.2 |
| 2012/0327214 | A1 * | 12/2012 | McEntyre | 348/86 |
| 2014/0092404 | A1 * | 4/2014 | Coon, Mark | 358/1.9 |

FOREIGN PATENT DOCUMENTS

JP    2001-239731 A    9/2001

* cited by examiner

*Primary Examiner* — Dung Tran
(74) *Attorney, Agent, or Firm* — Buchanan Ingersoll & Rooney PC

(57) ABSTRACT

A storage medium which stores a program to cause an image forming system to execute a process includes, (a1) forming a product image, which is subjected to color correction by a product LUT being applied thereto, and a verification image, which is subjected to color correction by a verification LUT being applied thereto on same paper, (b1) subjecting said verification image that is formed in (a1) to color measurement, (c1) determining whether verification LUT is applicable to color correction of the product image based on a difference between said color measurement values of the verification image that is measured in (b1) and target values, and (d1) forming the product image and the verification image, which are respectively subjected to color correction by applying the verification LUT that is determined to be applicable, and applying another verification LUT to color correction of said verification image, on same paper.

11 Claims, 11 Drawing Sheets

NON-TRANSITORY COMPUTER READABLE STORAGE MEDIUM STORED WITH PROGRAM FOR IMAGE FORMING SYSTEM, IMAGE FORMING APPARATUS, AND CONTROLLER

CROSS-REFERENCE TO RELATED APPLICATION

This application is based on Japanese Patent Application No. 2013-116266 filed on May 31, 2013, the contents of which are incorporated herein by reference.

BACKGROUND

1. Technical Field

The present invention relates to an image forming method, an image forming system, an image forming apparatus, a controller, a printer, a color correction apparatus and a non-transitory computer readable storage medium stored with a program for the apparatuses.

2. Description of Related Art

In recent years, with the progress in DTP (Desk-Top Publishing) technology and printing equipment, it has become possible to perform mass production of printed matter using electrophotography and ink jet systems. As such, there has been an increase in the importance of the accuracy and the consistency of the color of the printed matter that are output by the printing equipment and various color correction methods have been proposed.

Unexamined Japanese Patent Publication No. 2001-239731 discloses a technology that maintains the accuracy and the consistency of color of printed matter by carrying out calibration of the color correction of the printing equipment based on color measurement results of a printed image while outputting the printed matter with taking advantage of the characteristics of the printing equipment, that is it is possible to quickly change the output conditions of the printed matter. Specifically, when printing on paper, a calibration pattern is printed on the margin portion of the paper, which is cut off and removed without an image being printed thereon, the density of each color that constitutes the calibration pattern is measured, and the amount of color correction that is applied to the image data is adjusted based on the measurement results. Accordingly, the technology enables the periodic calibration of printing equipment while avoiding the waste of paper by using the margin portion of the paper.

SUMMARY

However, in the technology of the related art described above, the image that is printed on the paper and the calibration pattern that is printed on the margin portion of the paper are subjected to color correction using the same Look-Up Table (LUT). Therefore, there is a problem in which paper is wasted, in that dedicated output for verification is necessary in order to verify the color correction that is conducted using an LUT before the LUT is applied to actual product printed matter. There is also a problem in that the productivity of the printing equipment may not be sufficiently maximized, since it is necessary to temporarily stop the output operation of the printing equipment during the verification of the color correction performed using the LUT.

The present invention is intended to solve the aforementioned problems, and is to output a product image, which is subjected to color correction using a verified product LUT, and a verification image, which is subjected to color correction using a verification LUT that has not yet been applied to the color correction of the product image, on the same paper. Accordingly, an object of the present invention is to prevent paper from being wasted by not requiring dedicated output for verifying the LUT to be applied subsequently to the color correction of the product image, and to prevent a reduction in productivity by not requiring the output operation of the printing equipment to be stopped. A further object of the present invention is to maintain the output of a product image with normal color by always enabling the application of a verified LUT to the color correction of the product image.

To achieve at least one of the above-mentioned objects, an image forming method reflecting one aspect of the present invention comprises the following.

An image forming method comprising steps of: (a1) forming a product image, which is subjected to color correction by a product LUT being applied thereto, and a verification image, which is subjected to color correction by a verification LUT that has not yet been applied to color correction of said product image being applied thereto, on same paper; (b1) subjecting said verification image that is formed on said paper in said step (a1) to color measurement; (c1) determining whether or not said verification LUT is applicable to color correction of said product image based on a difference between color measurement values of said verification image that is subjected to color measurement in said step (b1) and target values; and (d1) forming said product image and said verification image, which are respectively subjected to color correction by applying said verification LUT that is determined to be applicable to color correction of said product image in said step (c1) to color correction of said product image as a new product LUT, and applying another verification LUT that has not yet been applied to color correction of said product image to color correction of said verification image, on same paper.

It is preferable that in said steps (a1) and (d1), said verification image is formed on a margin portion on which said product image is not formed, of said paper.

It is preferable that the image forming method further comprises a step of (e1) generating said verification LUT based on said color measurement values of said verification image that is subjected to color measurement in said step (b1) and said target values, wherein said other verification LUT in said step (d1) is said verification LUT that is generated in said step (e1).

The objects, features, and characteristics of this invention other than those set forth above will become apparent from the description given herein below with reference to preferred embodiments illustrated in the accompanying drawings.

DETAILED DESCRIPTION

Hereinafter, detailed description will be given, with reference to the accompanying drawings, of an image forming method, an image forming system, an image forming apparatus, a controller, a printer, a color correction apparatus, a program for the apparatuses and a non-transitory computer readable storage medium stored with the program for the apparatuses according to an embodiment of the present invention.

First Embodiment

Figure 1:
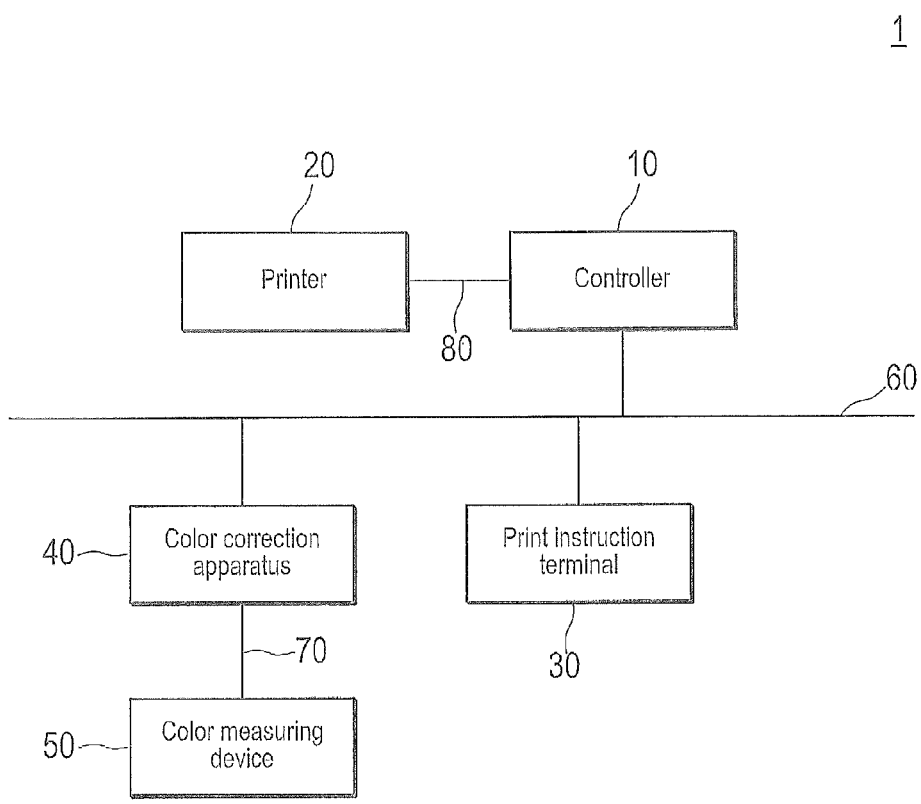
FIG. 1 is a block diagram showing an image forming system according to a first embodiment of the present invention.

FIG. 1 is a block diagram showing an image forming system according to a first embodiment of the present invention.

An image forming system 1 includes a print instruction terminal 30, a controller 10, a printer 20, a color measuring device 50 and a color correction apparatus 40.

The controller 10 and the printer 20 constitute the image forming unit and the image forming apparatus. The color measuring device 50 constitutes the color measuring unit. The controller 10 constitutes the determination unit. The color correction apparatus 40 constitutes the LUT generation unit.

The print instruction terminal 30, the controller 10 and the color correction apparatus 40 are connected via a network 60 so as to be capable of communicating with one another. The network 60 can be constituted of a wired or wireless LAN (Local Area Network), in which computers or network equipment are connected to one another using a standard such as Ethernet (registered trademark), Bluetooth (registered trademark), IEEE 802.11 or the like, or a Wide Area Network (WAN), in which LANs are connected to one another using a dedicated line.

It is possible to connect the color correction apparatus 40 to the color measuring device 50 with a dedicated line 70 using USB, for example.

It is possible to connect the controller 10 to the printer 20 with a dedicated line 80 using a high-speed serial bus interface based on the IEEE 1394 standard, for example. Meanwhile, the controller 10 and the printer 20 may also be connected using Ethernet.

The types and number of items of equipment connected to the network 60 are not limited to the example shown in FIG. 1. For example, the controller 10 and the printer 20 may be constituted by a MFP (Multi-Function Peripheral), in which the two integrally form an image forming apparatus, and connected to the network 60.

Figure 2:
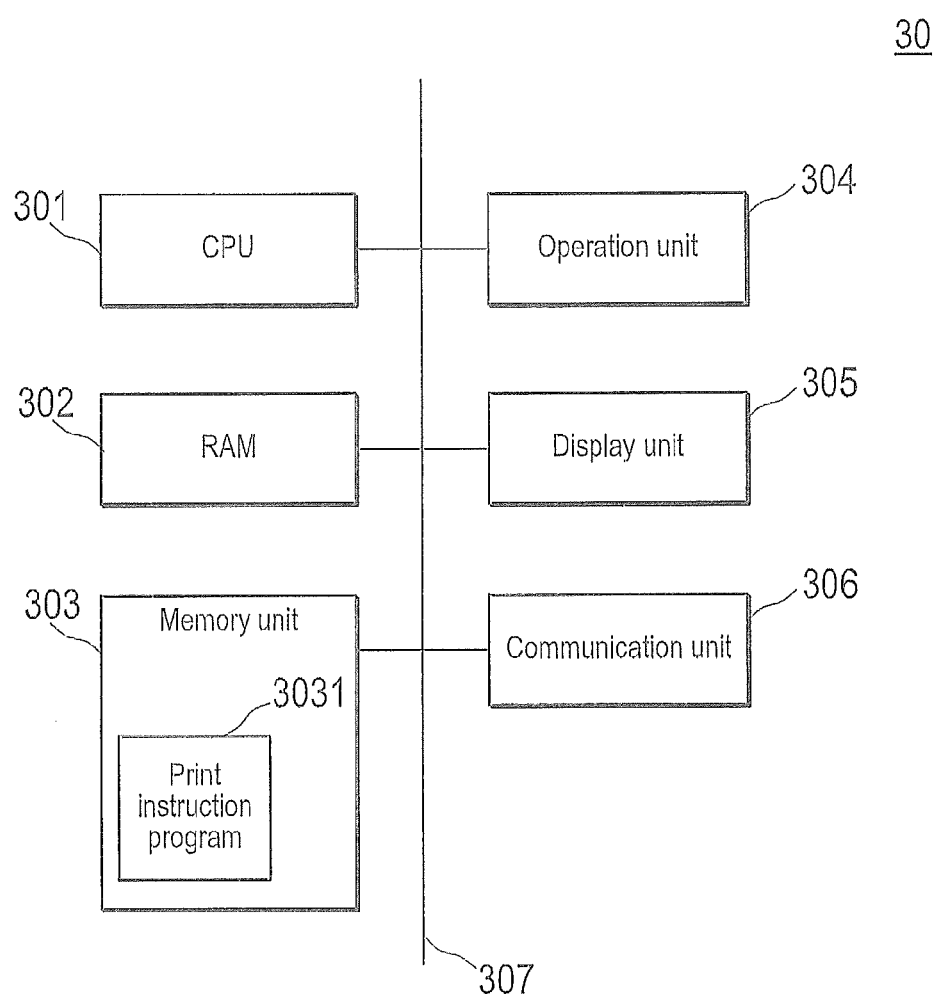
FIG. 2 is a block diagram showing the configuration of a print instruction terminal.

FIG. 2 is a block diagram showing the configuration of a print instruction terminal.

As shown in FIG. 2, the print instruction terminal 30 is provided with a CPU (Central Processing Unit) 301, a RAM (Random Access Memory) 302, a memory unit 303, an operation unit 304, a display unit 305 and a communication unit 306. These are interconnected via a bus 307 for performing communication of signals. The print instruction terminal 30 can be constituted by a personal computer, for example.

The CPU 301 performs the control of each of the parts described above and performs various calculation processes according to a program.

The RAM 302 temporarily store programs and data so as to provide a working region.

The memory unit 303 stores various programs, including an operating system, and various data. The memory unit 303 can be constituted by a ROM (Read Only Memory) and a HDD (Hard Disk Drive), for example.

A print instruction program 3031 is stored in the memory unit 303.

The operation unit 304 includes a pointing device such as a mouse, a keyboard, a touch panel and the like, for example, and is used in order to conduct various operations and input.

The display unit 305 is a liquid crystal display, for example, and displays various information.

The communication unit 306 is an interface for communicating with external equipment. A network interface defined according to a standard such as Ethernet, SATA (Serial Advanced Technology Attachment), PCI Express, USB or IEEE 1394, a wireless communication interface such as Bluetooth Ethernet (registered trademark) or IEEE 802.11, and a phone line interface for connecting to a phone line or the like can be used as the communication unit 306.

According to the configuration described above, the print instruction terminal 30 conducts a print instruction to cause the controller 10 to execute the print instruction program 3031. In other words, the print instruction terminal 30 transmits a print job to the controller 10, thereby conducting a print instruction to print (image forming) on paper an image based on the image data of the product image (hereinafter referred to as the "product image data") that is contained in the print job.

Figure 3:
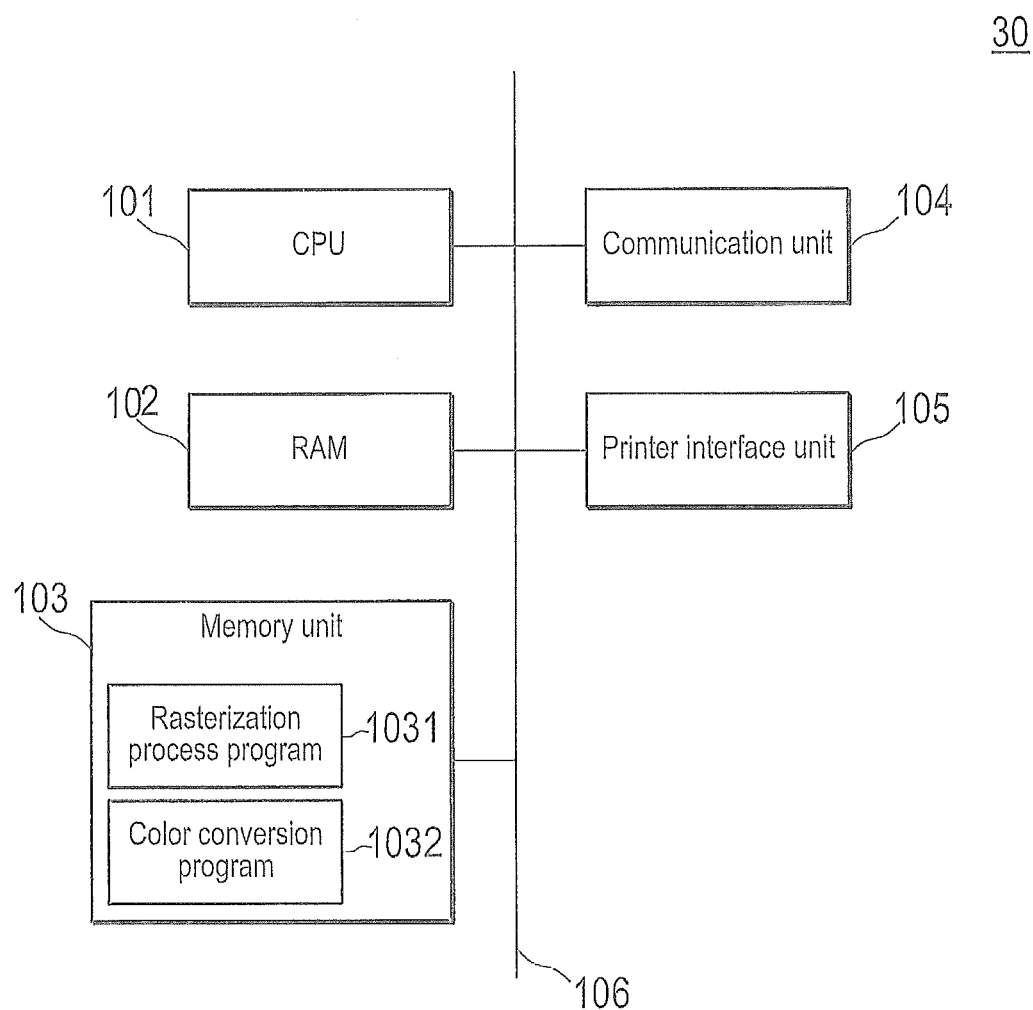
FIG. 3 is a block diagram showing the configuration of a controller.

FIG. 3 is a block diagram showing the configuration of a controller.

The controller 10 is provided with a CPU 101, RAM 102, a memory unit 103, a communication unit 104 and a printer interface unit 105. These parts are interconnected via a bus 106 for performing communications of signals.

Note that, since the functions of the CPU 101, the RAM 102, the memory unit 103 and the communication unit 104 are the same as those of the corresponding components of the print instruction terminal 30, redundant description will be omitted.

A rasterization process program 1031 and a color conversion program 1032 are stored in the memory unit 103. Additionally, print jobs received from the print instruction terminal 30 and a LUT (Look-Up Table, hereinafter, referred to simply as "LUT") that is applied to the color correction of an image and is received from the color correction apparatus 40, are stored in the memory unit 103.

The LUTs include a product LUT and a verification LUT. The product LUT is applied to the color correction of the product image as a result of verification being conducted in relation to color correction. The verification LUT has not yet been applied to the color correction of the product image, since verification has not been carried out in relation to color correction. As described hereinafter, the verification LUT is subjected to verification in relation to the color correction, as a candidate for the product LUT. When the verification LUT is determined to be applicable to the color correction of the product image as a result of the verification, the verification LUT is adopted as a new product LUT and applied to the color correction of the product image.

The printer interface unit 105 is an interface for communicating with the printer 20 that is connected locally.

According to the configuration described above, the controller 10 receives a print job from the print instruction terminal 30, then, converts the print job into product image data that can be printed by the printer 20. Specifically, the controller 10 executes the rasterization process program 1031, interprets a page description language that constitutes the print job, such as Postscript or PDF (Portable Document Format), and conducts the rasterization process in which the print job is converted into the product image data, which is bitmap data.

The controller 10 receives the product LUT and the verification LUT from the color correction apparatus 40. The controller 10 executes the color conversion program 1032 and conducts color correction of the product image by converting each pixel value of the product image data that is subjected to the rasterization process into each pixel value at which the printing performed by the printer 20 will be conducted with normal colors using the received product LUT. The controller 10 conducts color correction of the verification image by converting each pixel value of the image data of the verification image (hereinafter referred to as the "verification image data") into each pixel value for the printing conducted by the printer 20 using the received verification product LUT.

Note that, the controller 10 may also synchronize the rasterization process program 1031 and the color conversion program 1032 to perform the rasterization process and the color correction at the same time.

The verification image is a color chart that is constituted by a plurality of color patches, for example. The color chart may be constituted by a plurality of patches in which the density of single-color patches is changed in stages. The color chart may also be constituted by a plurality of patches in which the density of each chromatic color of patches, which overlap one another by a fixed ratio, of all the chromatic colors of the elementary colors of the printer is changed in stages. It is possible to store the verification image data, which is subjected to color correction using the verification LUT, in the memory unit 103, for example.

By combining the product image data that is converted using the product LUT and the verification image data that is converted using the verification LUT, the controller 10 generates the image data (hereinafter referred to as the "combined image data") for causing the printer 20 to print the product image that is subjected to color correction using the product LUT and the verification image subjected to color correction using the verification LUT on the same paper. Hereinafter, the image that is based on the combined image data will be referred to as the "combined image".

The controller 10 transmits the combined image data that is generated to the printer 20, and causes the printer 20 to print the product image and the verification image as a combined image on the same paper.

Figure 4:
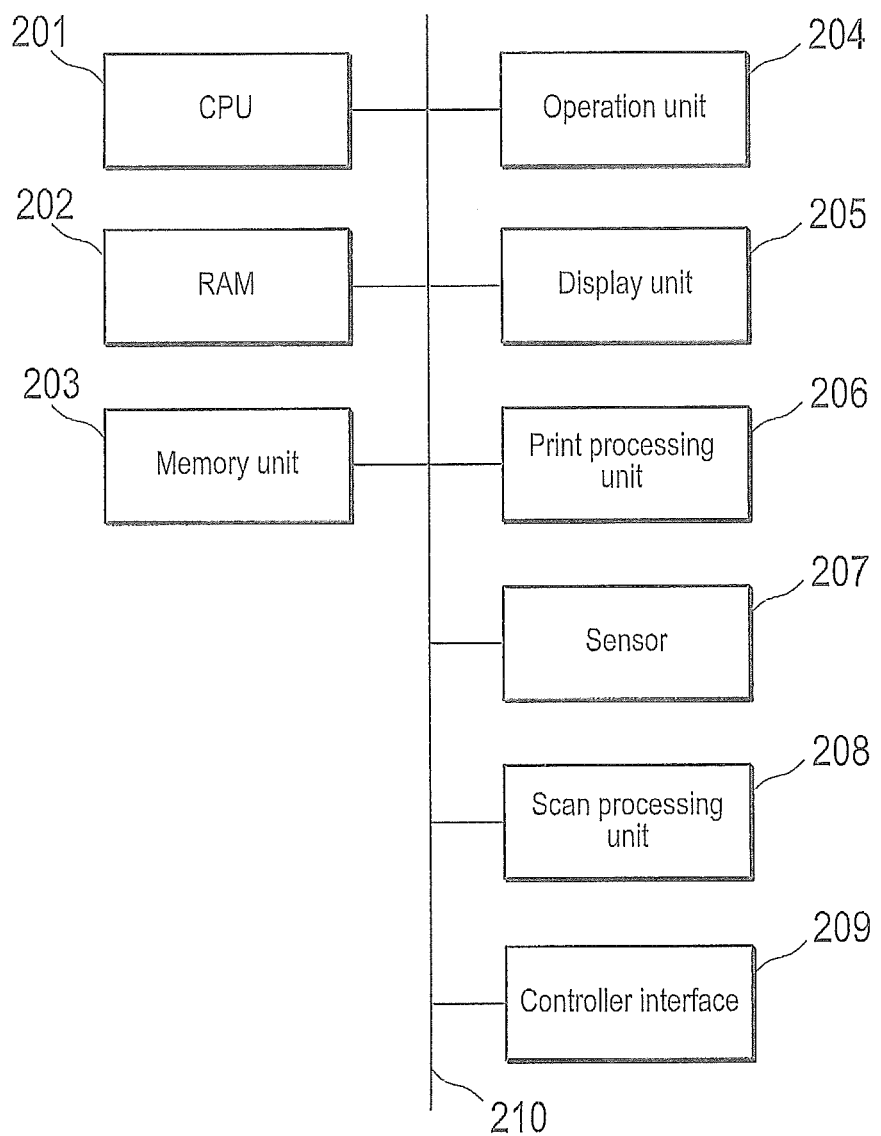
FIG. 4 is a block diagram showing the configuration of a printer.

FIG. 4 is a block diagram showing the configuration of a printer.

The printer 20 is provided with a CPU 201, a RAM 202, a memory unit 203, an operation unit 204, a display unit 205, a print processing unit 206, a sensor 207, a scan processing unit 208 and a controller interface 209. These parts are interconnected via a bus 210 for performing communications of signals.

Note that, since the functions of the CPU 201, the RAM 202, the memory unit 203, the operation unit 204 and the display unit 205 are the same as those of the corresponding components of the print instruction terminal 30, redundant description will be omitted.

The printer 20 may be constituted by an electrophotographic printer, an ink jet printer or a heat transfer printer, for example.

The print processing unit 206 prints an image that is based on the combined image data received from the controller 10 on paper using a well-known image creation process such as the electrophotographic process. In other words, the print processing unit 206 prints the product image and the verification image on the same paper.

The printing may be performed using CMYK (Cyan, Magenta, Yellow and Black) as the elementary colors.

The sensor 207 is a light detector that detects the spectral reflectivity in the color measurement of the verification image on the paper. The sensor 207 may be configured to include a photodiode, for example. The sensor 207 may be provided with a color measurement value calculation unit that is equivalent to the color measuring device 50, and function as a color measuring device. The sensor 207 may also be connected to the color measuring device 50 by a dedicated line (not shown), and the data of the spectral reflectivity that is detected by the sensor 207 is transmitted to the color measuring device 50.

In relation to the transport path on which the paper is transported when the image is printed in the print processing unit 206, the sensor 207 may be disposed at a later stage in the transport direction of the paper than the image forming part which is a component of the print processing unit 206 and prints the image on the paper. It is possible to reduce the time taken from verifying to adopting the verification LUT as the product LUT by conducting the color measurement of the verification image using a sensor, which is disposed at a later stage in the transport direction of the transport path of the paper than the image forming unit that forms an image on the paper in the printer. Accordingly, it is possible to effectively not require manual tasks to be performed by a person, and it is possible to continually perform stable printing with consistently accurate color tones. When automatically operating the printer 20, there is sometimes a demand to leave a record of the color management results of the printed matter, and it is possible to easily meet the demand by storing the verification results of the verification LUT in the memory unit of the color correction apparatus or by printing appropriate output from the printer.

The scan processing unit 208 irradiates a document that is set in a predetermined reading position of a document stand or a document that is transported to a predetermined reading position by an ADF (Auto Document Feeder) with light from a light source such as a fluorescent lamp, and generates digital data of the document image by receiving light while scanning the reflected light with a light receiving element such as a CCD (Charge Coupled Device) image sensor or a CMOS (Complementary Metal Oxide Semiconductor) image sensor.

The controller interface 209 is an interface for communicating with the controller 10 that is connected locally, for example.

The color measuring device 50 receives the spectral reflectivity data from the sensor 207 that is provided in the printer 20, converts the received spectral reflectivity data into color measurement values of a color system, which does not depend on a device, such as L*a*b* or XYZ, for example, and transmits the obtained color measurement values to the color correction apparatus 40.

Note that the color measurement values contain the measurement values of chromatic values of color and the measurement values of density values of color.

It is possible to use a spectrophotometer such as the i1Pro2 (registered trademark) manufactured by X-Rite, Inc., or scanner, for example, as the color measuring device 50.

Figure 5:
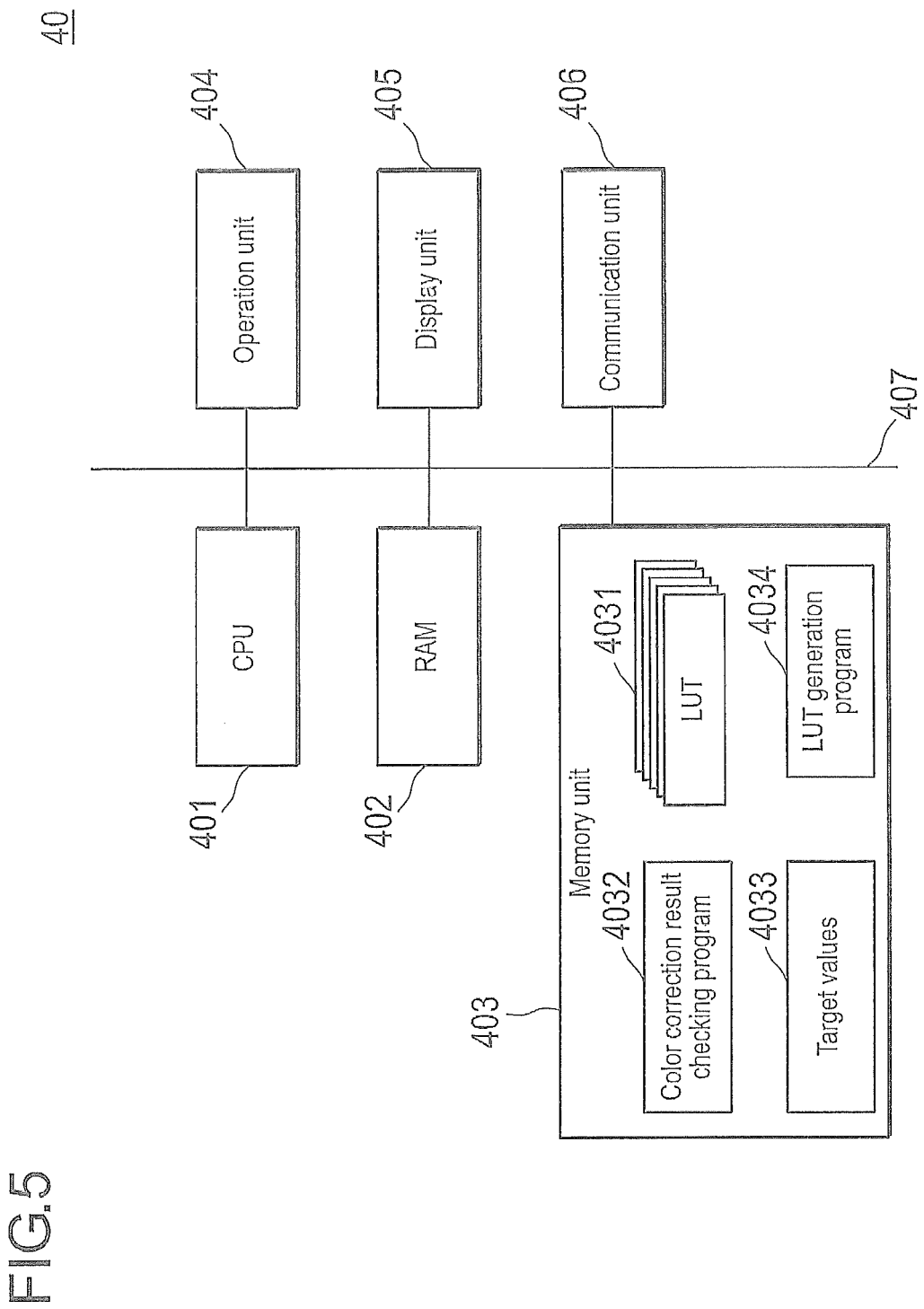
FIG. 5 is a block diagram showing the configuration of a color correction apparatus.

FIG. 5 is a block diagram showing the configuration of a color correction apparatus.

The color correction apparatus 40 is provided with a CPU 401, a RAM 402, a memory unit 403, an operation unit 404, a display unit 405 and a communication unit 406. These parts are interconnected via a bus 407 for performing communication of signals.

Note that, since the functions of the components of the color correction apparatus 40 are the same as those of the corresponding components of the print instruction terminal 30, redundant description will be omitted.

A color correction result checking program 4032 and an LUT generation program 4034 are stored in the memory unit 403. The data of each of target values 4033 and a LUT 4031 is also stored therein. The target values 4033 are the target values of the colors of the verification image that is printed by the printer 20. For example, the target values 4033 are the chromatic values or the density values of the colors which are correspond to each of the patches of the color chart, which is the verification image. The target values 4033 may be determined in advance when the apparatus is shipped and stored in the memory unit 403. The target values 4033 may also be arbitrarily created by the user and stored in the memory unit 403.

The LUT 4031 contains the product LUT and the verification LUT.

According to the configuration described above, the color correction apparatus 40 receives the color measurement values of the verification image that is printed by the printer 20 from the color measuring device 50 via the communication unit 406.

The color correction apparatus 40 executes the color correction result checking program 4032, compares the received color measurement values with the stored target values 4033, and calculates the difference between the color measurement values and the target values. The color correction apparatus 40 determines whether or not the verification LUT 4031 that is used in the color correction of the verification image that is measured by the color measuring device 50 is applicable to the color correction of the product image, based on the difference between the color measurement values and the target values 4033.

When the verification image is a color chart that is constituted by a plurality of patches in which the density of single-color patches is changed in stages, the color correction apparatus 40 can determine whether or not the verification LUT is applicable to the color correction of the product image in the following manner, for example. When the average value and/or the maximum value of the differences in density between the color measurement values of the verification image and the target values 4033 is less than or equal to a threshold that is determined in advance, it is possible to determine that the verification LUT is applicable to the color correction of the product image.

When the verification image is a color chart that is constituted by a plurality of patches in which the density of each chromatic color of patches, which overlap one another by a fixed ratio, of all the chromatic colors of the elementary colors of the printer 20, is changed in stages, the color correction apparatus 40 can determine whether or not the verification LUT is applicable to the color correction of the product image in the following manner, for example. When the average value and/or the maximum value of the color differences between the color measurement values (L*a*b* or the like) of the verification image and the target values is less than or equal to a threshold that is determined in advance, it is possible to determine that the verification LUT is applicable to the color correction of the product image. In this case, for example, when the average value of the color differences between the color measurement values of the verification image and the target values is less than or equal to 1.0 and the maximum value of the color differences is less than or equal to 3.0, it may be determined that the verification LUT is applicable to the color correction of the product image.

When it is determined that the verification LUT 4031 that is used in the color correction of the verification image that is subjected to color measurement is applicable to the color correction of the product image, the color correction apparatus 40 transmits the verification LUT 4031 that is determined to be applicable to the color correction of the product image to the controller 10 as the new product LUT 4031. The controller 10 applies the new product LUT 4031 that is received from the color correction apparatus 40 to the color correction of the product image.

The color correction apparatus 40 executes the color correction result checking program 4032, so that the color correction apparatus 40 may generate a verification LUT based on the received color measurement values and the stored target values 4033.

When the verification image is a color chart that is constituted by a plurality of patches in which the density of single-color patches is changed in stages, the color correction apparatus 40 can generate the verification LUT in the following manner, for example. The color correction apparatus 40 can create the verification LUT by calculating the LUT when the difference between the color measurement values of the received verification image and the target values is smallest.

When the verification image is a color chart that is constituted by a plurality of patches in which the density of each chromatic color of patches, which overlap one another by a fixed ratio, of all the chromatic colors of the elementary colors of the printer 20, is changed in stages, the color correction apparatus 40 can generate the verification LUT in the following manner, for example. The color correction apparatus 40 can create the verification LUT by calculating the LUT when the color difference of the color measurement values (L*a*b* or the like) between the color measurement values of the received verification image and the target values is smallest in relation to all or a portion of the plurality of patches.

Figure 6:
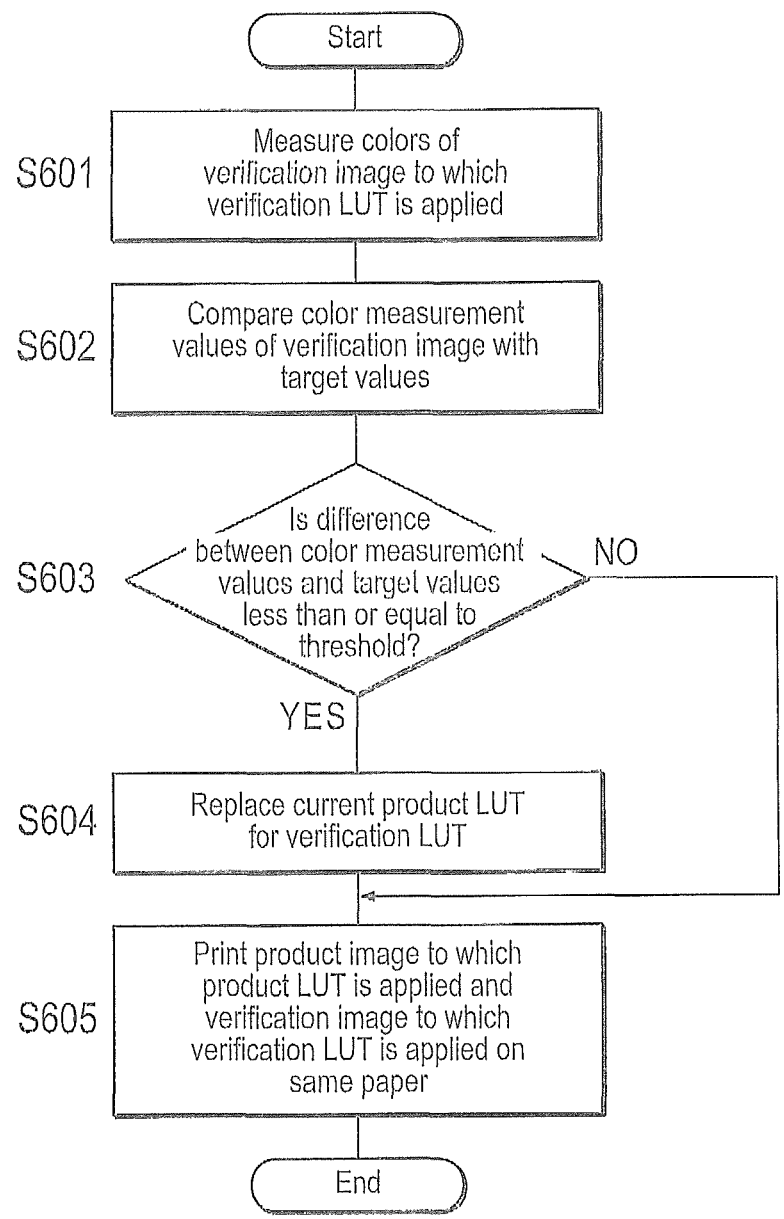
FIG. 6 is a diagram showing a flowchart illustrating when it is determined whether or not a verification LUT is applicable to the color correction of a product image as a new product LUT.

FIG. 6 is a diagram showing a flowchart illustrating when it is determined whether or not a verification LUT is applicable to the color correction of a product image as a new product LUT. The flowchart can be implemented using the image forming system according to the present embodiment.

In the flowchart, step S601 corresponds to step (b1) of the present invention, and likewise, steps S602 and S603 correspond to steps (c1) and (a5), steps S604 and S605 correspond to step (d1), and step S605 corresponds to steps (a1), (a2), (c2), (a3), (b3), (c3), (d3), (a4), (b4), (c4), (d4) and (b5).

In cooperation with the sensor 207, the color measuring device 50 measures the colors of the verification image, within the combined image which is printed on the paper, that is subjected to color correction by the verification LUT that is created by the color correction apparatus 40 being applied thereto. The color measuring device 50 then transmits color measurement values of the verification image that has been subjected to color measurement to the color correction apparatus 40 (S601).

The color correction apparatus 40 compares the color measurement values of the verification image that are received from the color measuring device 50 with the target values (S602).

The color correction apparatus 40 determines whether or not the difference between the color measurement values of the verification image and the target values is less than or equal to a threshold that is set in advance (S603). When the color correction apparatus 40 determines that the difference between the color measurement values of the verification image and the target values is less than or equal to a threshold that is set in advance (Yes in S603), the color correction apparatus 40 adopts the verification LUT that is applied to the color correction of the verification image that is subjected to color measurement as a new product LUT by replacing the current product LUT for the verification LUT (S604). When the color correction apparatus 40 determines that the difference between the color measurement values of the verification image and the target values is not less than or equal to a threshold that is set in advance (No in S603), the color correction apparatus 40 does not adopt the verification LUT that is applied to the color correction of the verification image that is subjected to color measurement as a new product LUT, and conducts the color correction of the product image of the subsequent page using the current product LUT. In this case, the verification LUT that is not adopted may be discarded.

Note that, the new product LUT is transmitted from the color correction apparatus 40 to the controller 10 when being adopted as the new product LUT in step S604. However, the verification LUT that is adopted as the new product LUT has already been transmitted to the controller 10 before being adopted as the new product LUT. Therefore, only information for identifying the verification LUT that is adopted as the new product LUT may be transmitted to the controller 10 when a new product LUT is adopted in step S604, for example.

The controller 10 conducts color correction on the product image and the verification image using the new product LUT and the verification LUT that are received from the color correction apparatus, respectively, generates the combined image data for causing the printer 20 to print the product image and the verification image on the same paper, and transmits the combined image data to the printer 20. The printer 20 prints the product image that is subjected to color correction by the product LUT being applied and the verification image that is subjected to color correction by the verification LUT being applied on the same paper by printing the combined image based on the received combined image data on the paper (S605).

Figure 7:
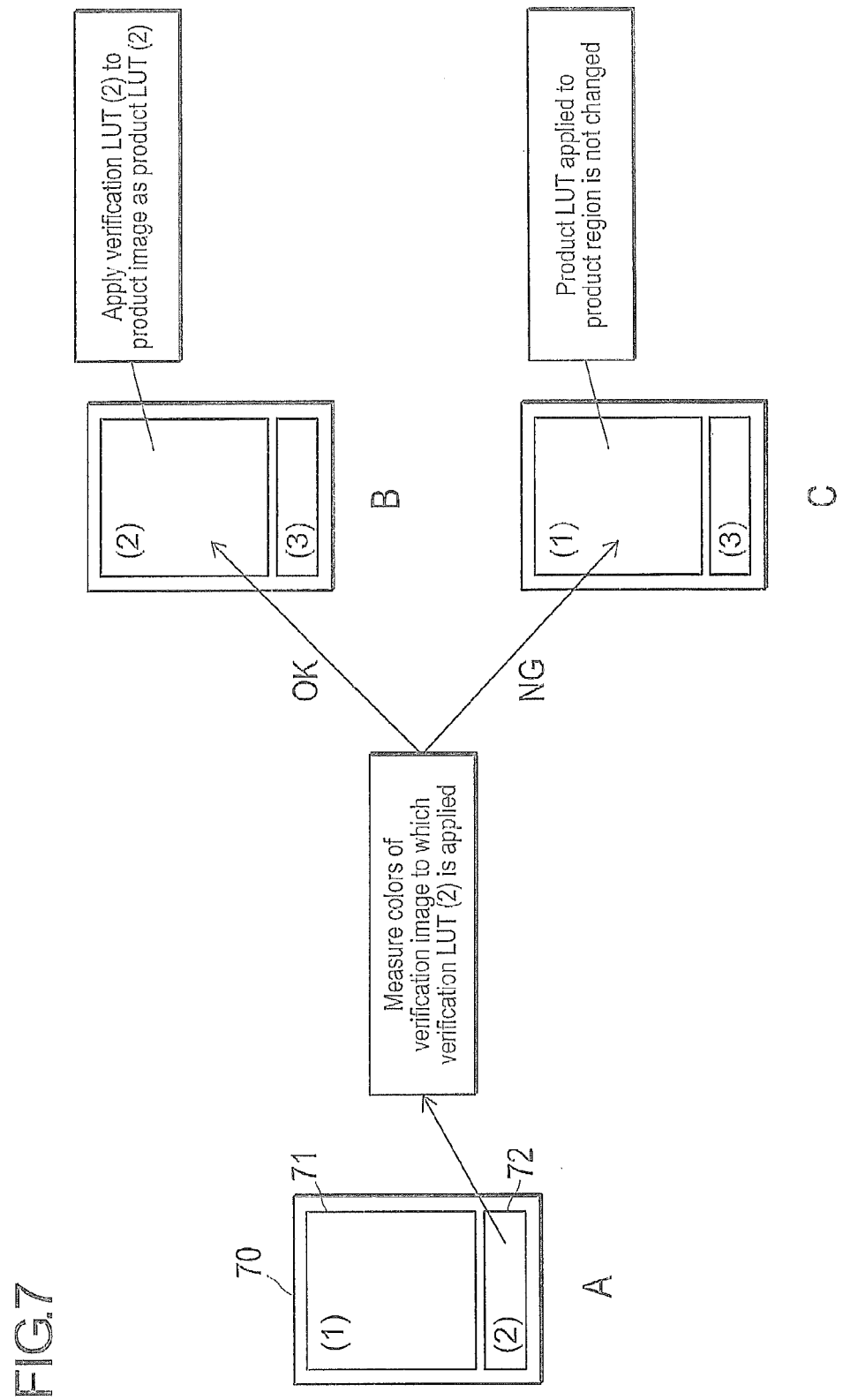
FIG. 7 is an explanatory diagram that illustrates, in time series, a combined image of a case in which a verification LUT is adopted as a new product LUT and applied to the color correction of the product image, and a combined image of a case in which a verification LUT is not adopted as a new product LUT.

FIG. 7 is an explanatory diagram that illustrates, in time series, a combined image of a case in which a verification LUT is adopted as a new product LUT and applied to the color correction of the product image, and a combined image of a case in which a verification LUT is not adopted as a new product LUT.

The product image based on the image data contained in the print job is printed on a product region 71 of paper 70. In addition, the paper 70 includes a margin portion 72 on which the product image is not printed, and the verification image is printed on the margin portion 72. In FIG. 7, numbers of the product LUT and the verification LUT that are applied to the product image and the verification image are shown on the product region 71 and the margin portion 72, respectively. The product LUTs and the verification LUTs with the same number are the same LUTs. Especially, the number (2) shown on the margin portion 72, for example, indicates that a verification image that is subjected to color correction by being applied the verification LUT (2), which has the number (2), has been printed. The number (2) shown on the product region 71 indicates that the verification LUT (2) becomes the product LUT (2) which has the number (2), by being adopted as the new product LUT, and that a product image that is subjected to color correction by being applied the product LUT (2) has been printed on the product region 71. Accordingly, the verification LUTs and the product LUTs with the same number are the same LUTs.

In A of FIG. 7, a combined image is shown which contains a product image that is subjected to color correction using the product LUT (1), and a verification image that is subjected to color correction using the verification LUT (2) that has not yet been verified in relation to the applicability to the product image and has not yet been applied to the color correction of the product image.

In B of FIG. 7, the verification image of A of FIG. 7 is subjected to color measurement and the applicability to the product image is verified. As a result, the following combined image is shown of a case in which the verification LUT (2) that is applied to the color correction of the verification image of A of FIG. 7 is determined to be applicable to the product image. The product image that is subjected to color correction using the verification LUT (2) that is adopted as the new product LUT (2) is printed on the product region 71 of the paper 70. The verification image to which a new verification LUT (3), which is not applied to the color correction of the product image due to the applicability thereof to the color correction of the product image not being verified yet, is applied is printed on the margin portion 72 of the paper 70.

In C of FIG. 7, the verification image of A of FIG. 7 is subjected to color measurement and the applicability to the product image is verified. As a result, the following combined image is shown of a case in which the verification LUT (2) that is applied to the color correction of the verification image of A of FIG. 7 is determined to be not applicable to the product image. The product image to which the current product LUT (1), which is applied to the color correction of the product image in A of FIG. 7, is applied without being changed is printed on the product region 71 of the paper 70. The verification image to which a new verification LUT (3), which is not applied to the color correction of the product image due to the applicability thereof to the color correction of the product image not being verified yet, is applied is printed on the margin portion 72 of the paper 70.

Note that, in the period shown in time series in FIG. 7 between A and B or C, it is possible to conduct the printing of the combined image, in which the product LUT (1) is applied to the product image and the verification LUT (2) is applied to the verification image, for a time that corresponds to the time that passes during the period.

Figure 8:
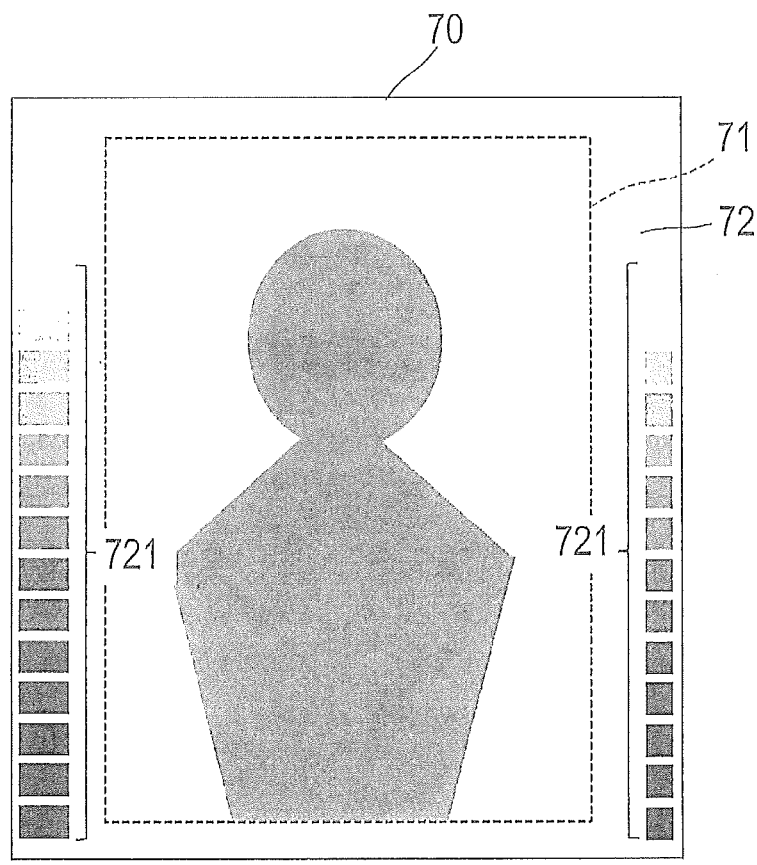
FIG. 8 is a view showing an example of the paper on which the combined image is printed by the printer.

FIG. 8 is a view showing an example of the paper on which the combined image is printed by the printer.

As shown in FIG. 8, the product image is printed on the product region 71 of the paper 70, and a color chart 721, which is the verification image, is printed on the margin portion 72. It is possible to make more efficient use of a paper surface of the paper 70 by conducting verification of the color correction that is conducted by using the verification LUT using the verification image that is printed on the margin portion 72, which is a region in which the printing of the product image is not conducted and that is to be removed by cutting.

Figure 9:
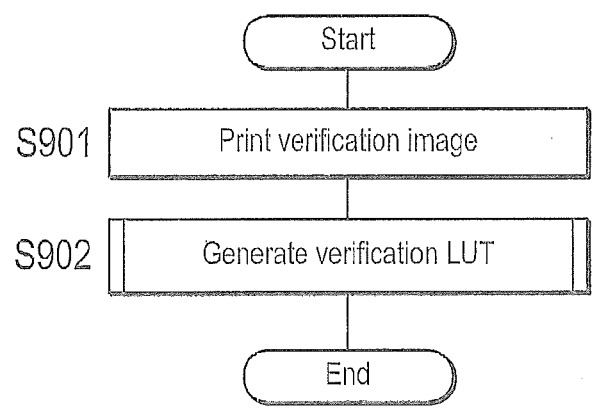
FIG. 9 is a diagram showing a flowchart for generating the verification LUT.

FIG. 9 is a diagram showing a flowchart for generating the verification LUT. The flowchart can be implemented using the image forming system according to the present embodiment.

In the flowchart, step S901 corresponds to steps (a1), (d1), (a2), (c2), (a3), (b3), (d3), (a4), (b4), (d4) and (b5) of the present invention, and step S902 corresponds to steps (e1) and (c5), respectively.

The printer 20 prints the verification image, which is a color chart, on the margin portion of the paper (S901).

The color correction apparatus 40 generates the verification LUT (S902).

Figure 10:
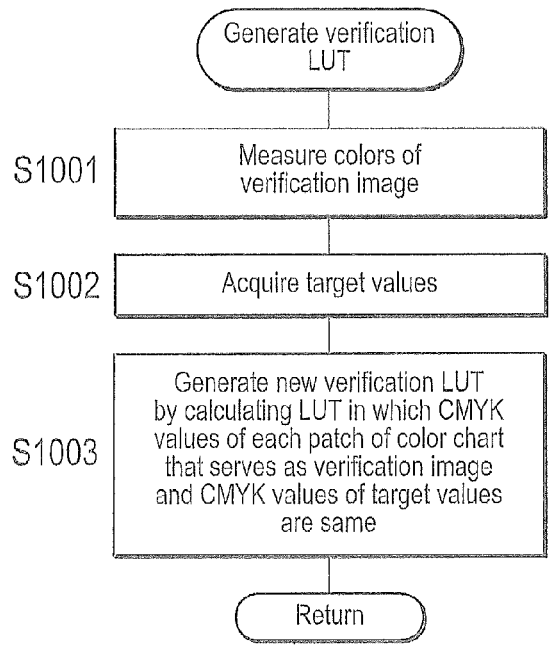
FIG. 10 is a diagram showing an example of a subroutine flowchart of step S902 of FIG. 9.

FIG. 10 is a diagram showing an example of a subroutine flowchart of step S902 of FIG. 9. FIG. 10 shows a subroutine flowchart of a case in which the verification LUT is a one dimensional LUT that conducts color correction by adjusting the density of each single-color of CMYK. When the verification LUT is a one dimensional LUT, a color chart, which is constituted by a plurality of patches in which the density of single-color patches is changed in stages, is used as the verification image.

In cooperation with the sensor 207, the color measuring device 50 measures the colors of the color chart, which is the verification image that is printed in step S901. The color measuring device 50 then transmits the density values, which are the color measurement values, of the colors of each patch in the color chart to the color correction apparatus 40 (S1001).

The color correction apparatus 40 acquires the target values 4033 that are formed of the CMYK values that correspond to the CMYK values, which are the density values of the colors of each patch that constitutes the color chart, by reading the target values 4033 from the memory unit 403 (S1002).

The color correction apparatus 40 calculates a LUT in which the CMYK values that are the density values of the colors of each patch of the color chart of the verification image, and the CMYK values that are the target values are the same values, based on the density values, which are the color measurement values, of the colors of each patch of the color chart and the target values 4033. In this manner, the color correction apparatus 40 creates a new verification LUT (S1003).

Figure 11:
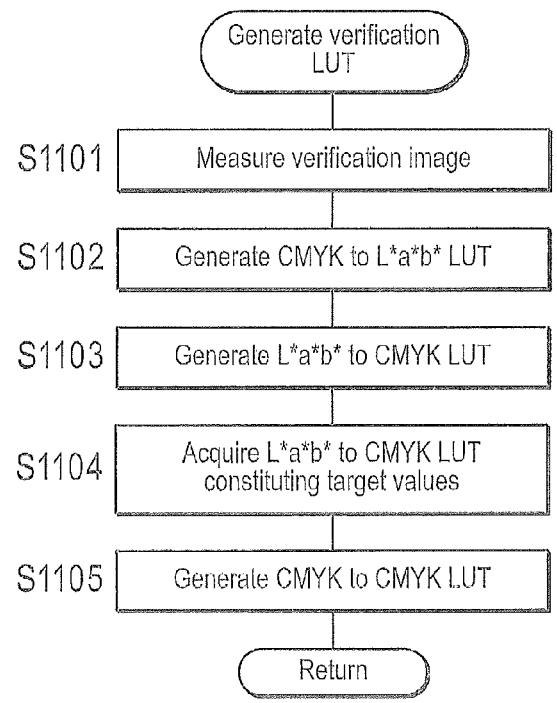
FIG. 11 is a diagram showing another example of a subroutine flowchart of step S902 of FIG. 9.

FIG. 11 is a diagram showing another example of a subroutine flowchart of step S902 of FIG. 9. FIG. 11 shows a subroutine flowchart of a case in which the verification LUT 4031 is a multi-dimensional LUT that conducts color correction for each combination of CMYK. When the verification LUT 4031 is a multi-dimensional LUT, a color chart, which is constituted by a plurality of patches in which the density of each chromatic color of patches, which overlap one another by a fixed ratio, of all the chromatic colors of the elementary colors of the printer 20 is changed in stages, is used as the verification image, for example.

It is possible to create the multi-dimensional LUT as described below, in the same manner as a general ICC (International Color Consortium) devicelink profile.

In cooperation with the sensor 207, the color measuring device 50 measures the colors of the color chart, which is the verification image that is printed in step S901, and transmits the L*a*b* values, which are the chromatic values of each patch in the color chart to the color correction apparatus 40 as the color measurement values (S1101).

The color correction apparatus 40 generates a CMYK to L*a*b* LUT, which provides the relationship between the CMYK values of the target values and the L*a*b* values that are received from the color measuring device 50, by an interpolation calculation (S1102).

Then, the color correction apparatus 40 generates an L*a*b* to CMYK LUT based on the CMYK to L*a*b* LUT generated in step S1102 by a calculation (S1103).

Then, the CMYK to L*a*b* LUT that is the target values 4033 is acquired by being read out from the memory unit 403 (S1104).

Then, the CMYK values that provide the L*a*b* values, which are the same as each of the CMYK values of the target values 4033, are calculated using the CMYK to L*a*b* LUT that is the target values 4033 and the L*a*b* to CMYK LUT that is generated in step S1103. In this manner, the color correction apparatus 40 creates a four dimensional LUT that constitutes a CMYK to CMYK LUT as the verification LUT 4031 (S1105).

Note that, in the calculation of each LUT in FIGS. 10 and 11, it is possible to use an interpolation calculation such as triangular pyramid interpolation or quadrangular pyramid interpolation, or gamut mapping, as necessary.

Additionally, it is possible to use a UCR/GCRprocess in order to uniquely obtain the CMYK values from the L*a*b* values.

The verification LUT 4031 may include a one dimensional LUT in at least one of the input side or the output side, as necessary.

The present embodiment has the following effects.

A product image, which is subjected to color correction using a verified product LUT, and a verification image, which is subjected to color correction using a verification LUT that has not yet been applied to the color correction of the product image, are output on the same paper. Accordingly, it is possible to prevent paper from being wasted by not requiring dedicated output for verifying the LUT to be applied to the color correction of the subsequent product image. At the same time, it is possible to prevent a reduction in productivity by not requiring the output operation of the printing equipment to be stopped. Furthermore, it is possible to maintain the output of a product image with normal color by always enabling the application of a verified LUT to the color correction of the product image.

It is possible to make more efficient use of a paper surface of the paper, since it becomes possible to verify the color correction that uses the verification LUT by using the verification image that is printed on the margin portion, which is a region to be removed by cutting, by printing the verification image on the margin portion, on which the printing of the product image is not performed.

It is possible to reduce the time taken from verifying to adopting the verification LUT as the product LUT by conducting the color measurement of the verification image using a sensor, which is disposed at a later stage in the transport direction of the transport path of the paper than the image forming unit that forms an image on the paper in the printer. Accordingly, it is possible to effectively not require manual tasks to be performed by a person, and it is possible to continually perform stable printing with consistently accurate color tones. When automatically operating the printer 20, there is sometimes a demand to leave a record of the color management results of the printed matter, and it is possible to easily meet the demand by storing the verification results of the verification LUT in the memory unit of the color correction apparatus or by printing appropriate output from the printer.

Second Embodiment

Detailed description will now be given of an image forming method, an image forming system, an image forming apparatus, a controller, a printer, a color correction apparatus, a program for the apparatuses, and a non-transitory computer readable storage medium stored with the program for the apparatuses according to a second embodiment of the present invention.

Differently from the first embodiment described above, each time the verification LUT is verified based on the color measurement values of the verification image which is subjected to color correction using the verification LUT, the subsequent new verification LUT is created based on the color measurement values. Since the present embodiment is the same as the first embodiment in other aspects, description of redundant configurations will be omitted or simplified.

Figure 12:
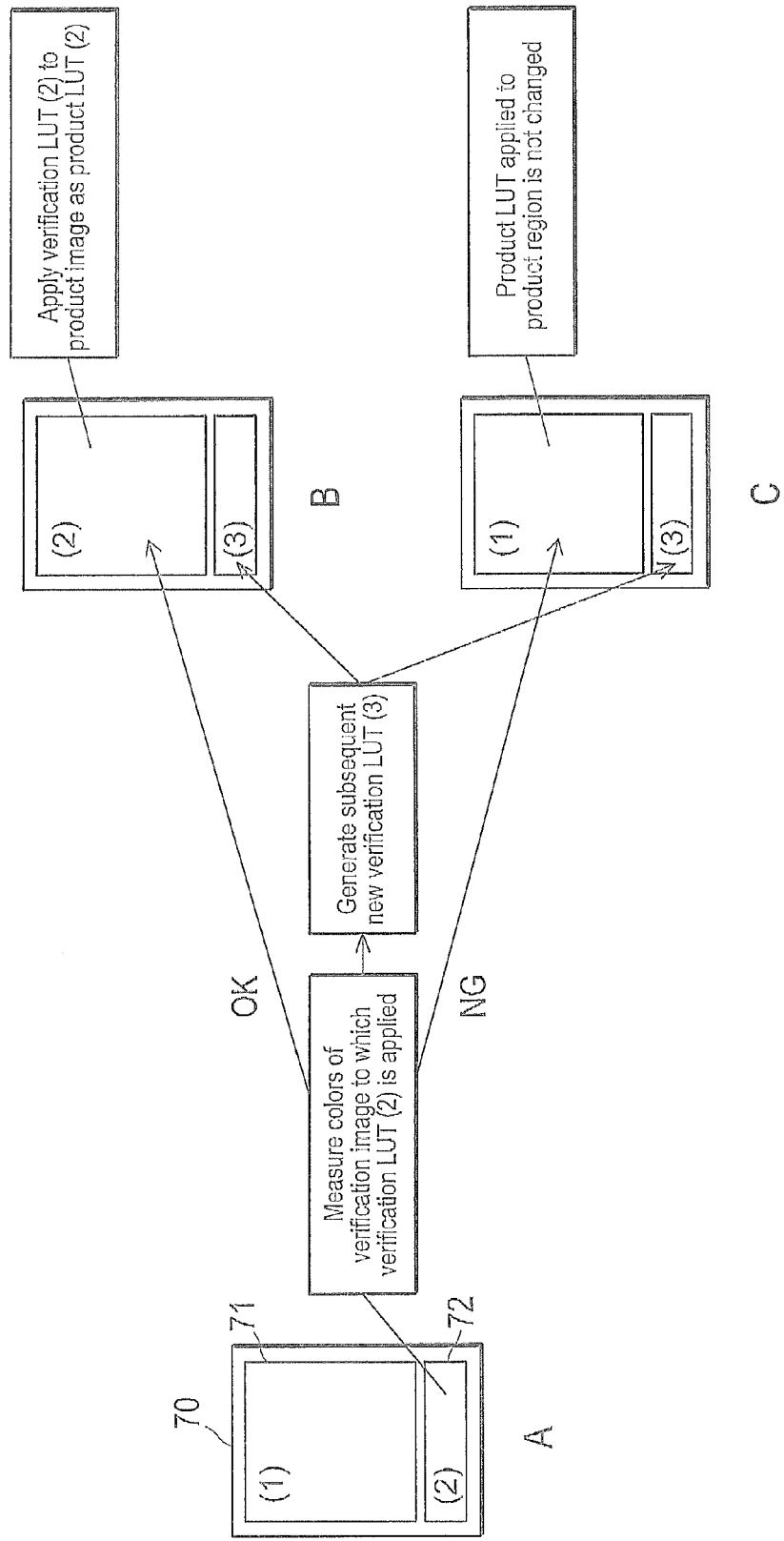
FIG. 12 is an explanatory diagram that illustrates, in time series, combined images of a case in which, each time the verification LUT is verified based on the color measurement values of the verification image, which is subjected to color correction using the verification LUT, the subsequent new verification LUT is created based on the color measurement values.

FIG. 12 is an explanatory diagram that illustrates, in time series, combined images of a case in which, each time the verification LUT is verified based on the color measurement values of the verification image, which is subjected to color correction using the verification LUT, the subsequent new verification LUT is created based on the color measurement values.

In A of FIG. 12, a combined image is shown which contains a product image that is subjected to color correction using the product LUT (1), and a verification image that is subjected to color correction using the verification LUT (2) that has not yet been verified in relation to the applicability to the product image and has not yet been applied to the color correction of the product image.

In B of FIG. 12, the verification image of A of FIG. 12 is subjected to color measurement and the applicability to the product image is verified based on the color measurement values. As a result, the combined image that is subsequently printed is shown of a case in which the verification LUT (2) that is applied to the color correction of the verification image of A of FIG. 12 is determined to be applicable to the product image. The product image that is subjected to color correction using the verification LUT (2) that is adopted as the new product LUT (2) is printed on the product region 71 of the paper 70. The verification image of A of FIG. 12 is subjected to color measurement, and the verification image, which is subjected to color correction by a subsequent new verification LUT (3) that is generated based on the color measurement values and the target values 4033 being applied, is printed on the margin portion 72 of the paper 70.

In C of FIG. 12, the verification image of A of FIG. 12 is subjected to color measurement and the applicability to the product image is verified based on the color measurement values. As a result, the combined image that is subsequently printed is shown of a case in which the verification LUT (2) that is applied to the color correction of the verification image of A of FIG. 12 is determined to be not applicable to the product image. The product image to which the current product LUT (1), which is applied to the color correction of the product image in A of FIG. 12, is applied without being changed is printed on the product region 71 of the paper 70. The verification image of A of FIG. 12 is subjected to color measurement, and the verification image, which is subjected to color correction by a subsequent new verification LUT (3) that is created based on the color measurement values being applied, is printed on the margin portion 72 of the paper 70.

Figure 13:
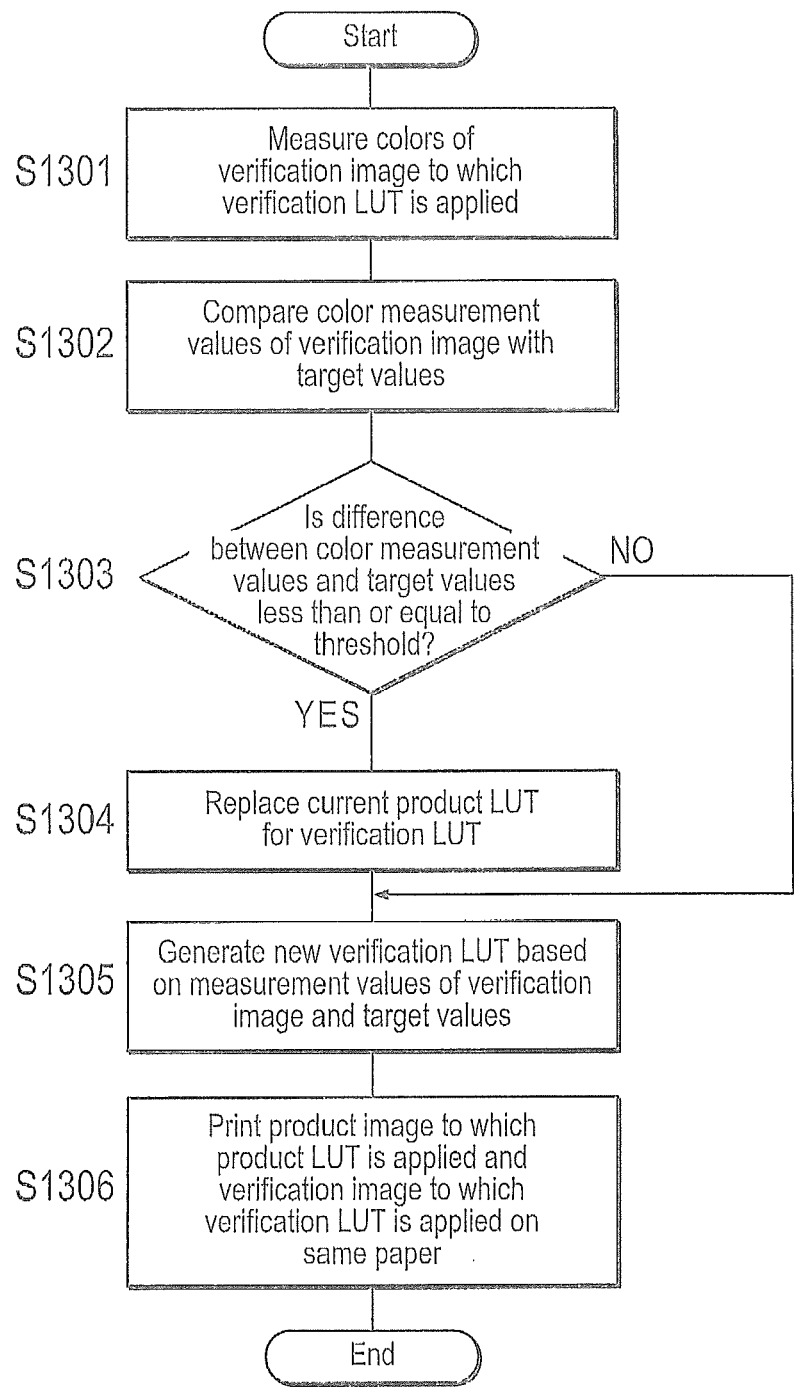
FIG. 13 is a diagram showing a flowchart that is implemented when it is determined whether or not a verification LUT is applicable to the color correction of the product image as a new product LUT based on the color measurement values of the verification image to which the verification LUT is applied, and a new verification LUT based on the color measurement values is generated.

FIG. 13 is a diagram showing a flowchart that is implemented when it is determined whether or not a verification LUT is applicable to the color correction of the product image as a new product LUT based on the color measurement values of the verification image to which the verification LUT is applied, and a new verification LUT based on the color measurement values are generated. The flowchart can be implemented by the image forming system according to the present embodiment.

Step S1305 of the flowchart corresponds to step (e1) of the present invention.

In cooperation with the sensor 207, the color measuring device 50 measures the colors of the verification image that is subjected to color correction by being applied the verification LUT that is generated by the color correction apparatus 40 being applied thereto. The color measuring device 50 then transmits color measurement values to the color correction apparatus 40 (S1301).

The color correction apparatus 40 compares the color measurement values of the verification image that are received from the color measuring device 50 with the target values (S1302).

The color correction apparatus 40 determines whether or not the difference between the color measurement values of the verification image and the target values 4033 is less than or equal to a threshold that is set in advance (S1303). When the color correction apparatus 40 determines that the difference between the color measurement values of the verification image and the target values is less than or equal to a threshold that is set in advance (Yes in S1303), the color correction apparatus 40 adopts the verification LUT that is applied to the color correction of the verification image that is subjected to color measurement as a new product LUT by replacing the current product LUT for the verification LUT (S1304). When the color correction apparatus 40 determines that the difference between the color measurement values of the verification image and the target values is not less than or equal to a threshold that is set in advance (No in S1303), the color correction apparatus 40 does not adopt the verification LUT that is applied to the color correction of the verification image that is subjected to color measurement as a new product LUT, and applies the product LUT that is applied to the color correction of the immediately prior product image to the color correction of the product image of the subsequent page as the current product LUT.

The color correction apparatus 40 generates the new verification LUT based on the color measurement values of the verification image that is received in step S1302 and the target values 4033, and transmits the new verification LUT to the controller 10 (S1305).

The controller 10 conducts color correction on the product image and the verification image using the current product LUT and the new verification LUT that is created in step S1305, respectively, generates the combined image data for causing the printer 20 to print the product image and the verification image on the same paper, and transmits the combined image data to the printer 20. The printer 20 prints the product image that is subjected to color correction by the product LUT being applied thereto and the verification image that is subjected to color correction by the verification LUT being applied thereto on the same paper by printing the combined image based on the received combined image data on the paper (S1306).

The present embodiment has the following effects in addition to the effects exhibited by the first embodiment.

Each time the verification LUT is verified based on the color measurement values of the verification image, which is subjected to color correction using the verification LUT, the subsequent new verification LUT is generated based on the color measurement values. Accordingly, it is possible to reduce the interval between performing the color correction on the printed matter. It is possible to further reduce the wasting of paper, since it is no longer necessary to print the verification LUT on the margin of the paper for the sole purpose of creating a new LUT.

Description has been given of the embodiments according to the present invention; however, the present invention is not limited to the embodiments described above.

For example, the controller, the printer, the print instruction terminal, the color correction apparatus, and the color measuring device may include a portion or all of the other components of one another. Specifically, for example, the print instruction terminal may be included in the controller, and the color correction apparatus may be included in the print instruction terminal. A portion or all of at least one of the color correction apparatus and the color measuring device may be included in the printer or the controller. The sensor may be included in the color measuring device.

In the embodiments described above, in the controller, the product LUT and the verification LUT are applied to the color correction of the product image and the verification image, respectively. However, the color correction of the product image and the verification image that is performed by applying the product LUT and the verification LUT, respectively, may also be performed by the printer during the printing.

In the embodiments described above, a portion or all of the functions that are realized by executing at least one of the print instruction program, the rasterization process program, and the color conversion program may be realized by replacing a portion or all of the programs for hardware such as a circuit.

What is claimed is:

1. A non-transitory computer readable storage medium stored with a program, said program causing an image forming system to execute a process comprising:
    (a1) forming a product image, which is subjected to color correction by a product LUT being applied thereto, and a verification image, which is subjected to color correction by a verification LUT that has not yet been applied to color correction of said product image being applied thereto, on same paper;
    (b1) subjecting said verification image that is formed on said paper in said process (a1) to color measurement;
    (c1) determining whether or not said verification LUT is applicable to color correction of said product image based on a difference between said color measurement values of said verification image that is subjected to color measurement in said process (b1) and target values; and
    (d1) forming said product image and said verification image, which are respectively subjected to color correction by applying said verification LUT that is determined to be applicable to color correction of said product image in said process (c1) to color correction of said product image as a new product LUT, and applying another verification LUT that has not yet been applied to color correction of said product image to color correction of said verification image, on same paper.

2. The non-transitory computer readable storage medium as claimed in claim 1, wherein
    in said processes (a1) and (d1), said verification image is formed on a margin portion on which said product image is not formed, of said paper.

3. The non-transitory computer readable storage medium as claimed in claim 1, said process further comprising:
    (e1) generating said verification LUT based on said color measurement values of said verification image that is subjected to color measurement in said process (b1) and said target value, wherein
    said another verification LUT in said process (d1) is said verification LUT that is created in said process (e1).

4. The non-transitory computer readable storage medium as claimed in claim 1, wherein
    in said process (b1), said verification image is subjected to color measurement using a sensor, which is disposed at a later stage in a transport direction of a transport path of said paper than an image forming part that forms an image on said paper of said image forming system.

5. A non-transitory computer readable storage medium stored with a program, said program causing an image forming apparatus to execute a process comprising:
    (a2) forming a product image, which is subjected to color correction by a product LUT being applied thereto, and a verification image, which is subjected to color correction by a verification LUT that has not yet been applied to color correction of said product image being applied thereto, on same paper;
    (b2) receiving said verification LUT that is determined to be applicable to color correction of said product image based on a difference between color measurement values of said verification image that is formed on said paper in said process (a2) and target values; and
    (c2) forming said product image and said verification image, which are respectively subjected to color correction by applying said verification LUT that is received in said process (b2) to color correction of said product image as a new product LUT, and applying another verification LUT that has not yet been applied to color correction of said product image to color correction of said verification image, on same paper.

6. The non-transitory computer readable storage medium as claimed in claim 5, wherein
    in said process (a2), said verification image is formed on a margin portion on which said product image is not formed, of said paper.

7. The non-transitory computer readable storage medium as claimed in claim 5, wherein
    said verification LUT that is received in said process (b2) is generated based on said color measurement values of said verification image that is subjected to color measurement and said target values.

8. The non-transitory computer readable storage medium as claimed in claim 5, wherein
    said verification LUT is generated based on said color measurement values of said verification image that is subjected to color measurement using a sensor, which is disposed at a later stage in a transport direction of a transport path of said paper than an image forming part that forms an image on said paper of said image forming apparatus and said target values.

9. A non-transitory computer readable storage medium stored with a program, said program causing a controller to execute a process comprising:
    (a3) generating image data for causing a printer to form a product image, which is subjected to color correction by a product LUT being applied thereto, and a verification image, which is subjected to color correction by a verification LUT that has not yet been applied to color correction of said product image being applied thereto, on same paper;
    (b3) transmitting said image data that is generated in said process (a3) to said printer;

(c3) receiving said verification LUT that is determined to be applicable to color correction of said product image based on a difference between color measurement values of said verification image that is formed on said paper by said printer based on said image data that is transmitted to said printer in said process (b3) and target values; and (d3) forming said product image and said verification image, which are respectively subjected to color correction by applying said verification LUT that is received in said process (c3) to color correction of said product image as a new product LUT, and applying another verification LUT that has not yet been applied to color correction of said product image to color correction in image formation of said verification image, on same paper.

10. The non-transitory computer readable storage medium as claimed in claim 9, wherein
in said processes (a3) and (d3), said image data is generated in which said verification image is formed on a margin portion on which said product image is not formed, of said paper.

11. The non-transitory computer readable storage medium as claimed in claim 9, wherein
said verification LUT that is received in said process (c3) is generated based on said color measurement values of said verification image that is subjected to color measurement and said target values.

* * * * *